United States Patent [19]

Shiramizu et al.

[11] Patent Number: 4,482,797

[45] Date of Patent: Nov. 13, 1984

[54] ELECTRODE BIASING WELDING TORCH

[75] Inventors: Kousuke Shiramizu, Toyota; Yoshiro Awano, Nagoya; Hiroyuki Takeyama, Okazaki; Kenji Sakakibara, Toyota; Hiroji Okada, Takatsuki; Hiromu Yamagami, Osaka, all of Japan

[73] Assignees: Osaka Transformer Co., Ltd., Osaka; Toyota Jidosha Kabushiki, Aichi, both of Japan

[21] Appl. No.: 396,299

[22] Filed: Jul. 8, 1982

[30] Foreign Application Priority Data

Nov. 30, 1981 [JP] Japan ................. 56-193138

[51] Int. Cl.$^3$ ............................................. B23K 9/16
[52] U.S. Cl. ............................ 219/137.61; 219/74; 219/137.2
[58] Field of Search ........... 219/137.2, 137.44, 137.51, 219/137.61, 138, 74, 136

[56] References Cited

U.S. PATENT DOCUMENTS

| | | | |
|---|---|---|---|
| 2,179,108 | 11/1939 | Westberg | 219/137.61 |
| 2,636,967 | 4/1953 | Bassot et al. | 219/137.61 |
| 3,007,032 | 10/1961 | Whiteman | 219/136 |
| 3,108,180 | 10/1963 | Linnander | 219/137.44 |
| 3,736,400 | 5/1973 | Spiegel et al. | 219/74 |

FOREIGN PATENT DOCUMENTS

| | | |
|---|---|---|
| 197664 | 5/1958 | Austria . |
| 230165 | 11/1963 | Austria . |
| 2334335 | 7/1974 | Fed. Rep. of Germany . |
| 2645679 | 4/1978 | Fed. Rep. of Germany . |
| 2074069 | 10/1981 | United Kingdom . |

OTHER PUBLICATIONS

Publication by Siemens-Schuckert Werke, Germany, Aug. 1963.

Primary Examiner—C. L. Albritton
Assistant Examiner—Alfred S. Keve
Attorney, Agent, or Firm—Jackson, Jones & Price

[57] ABSTRACT

An improved welding torch which includes a contact member constituted by a power feeding member having a through-opening for passing a consumable electrode wire and a support member for supporting the power feeding member, an electrode wire guide member covered, at least at its forward end portion, by the contact member, with at least the forward end portion of the guide member and the contact member being arranged to be movable with respect to each other in direction intersecting generally at right angles with an axis of the electrode wire, and a pressure member for relatively urging the contact member and the guide member for holding the electrode wire.

12 Claims, 15 Drawing Figures

ELECTRODE BIASING WELDING TORCH

BACKGROUND OF THE INVENTION

The present invention generally relates to welding and more particularly, to a welding torch employing a welding wire as a consumption or consumable electrode.

Commonly, when a consumption electrode is employed for a welding torch, electric current is fed to the electrode through a contact member held in contact with said electrode, and in the above case, a long service life for the welding torch has been required despite problems of severe abrasion or wear of the contact member. In order to cope with the problem as described above, there has conventionally been proposed an arrangement as shown, for example, in FIGS. 1 and 2.

More specifically, in a known welding torch disclosed in FIGS. 1 and 2, a first and second abrasion-resisting guide members 3a and 3b are provided along an electrode passage in a torch body 1' so as to be spaced with respect to each other, while a heat resisting and abrasion-resisting guide block 3c having a thickness smaller than a width of the electrode is provided at one side of the electrode passage between the guide members 3a and 3b. An electrode 17 is held between the guide block 3c and a contact member 7' having a thickness exceeding the width of the electrode, and is delivered being fed with electric current through the contact member 7', thereby to perform the welding operation. Accordingly, the contact member 7' is merely formed with a deep groove as shown in FIG. 2 even if it is worn out and thus, a welding operation may be performed without hindrance.

Incidentally, in an arc welding, the so-called stick phenomenon often takes place wherein the electrode tip end adheres to an item to be welded (not shown) during arc starting or during welding. In this case, resistance heating represented by $I^2R$ is produced in a contact position between the contact member 7' and the electrode 17, i.e., between the current feeding position and welding position at the electrode tip end and thus, the electrode can be extremely softened to deformable state. In connection with the above, although the delivery of the electrode is arranged to be properly interrupted through detection, for example, of shortcircuit current, it is seldom that the delivery of the electrode is suspended immediately when the electrode tip end has been fused onto the item to be welded. Namely, even after the electrode tip end has been fused onto the item to be welded, the electrode in its extremely softened state is still delivered to a certain extent, onto the welding item. In the above case, since the second abrasion-resisting guide member 3b is disposed in a position closer to the end of the electrode 17 than the contact position between the contact member 7' and the electrode 17 as shown in FIG. 1, the extremely softened electrode to be delivered towards the welding item beyond the contact position, becomes as if it were set into a hole of the second abrasion-resisting guide member 3b to form a so-called stick phenomenon as shown in the two-dotted chain lines in FIG. 3, with the result that the feeding of the electrode must be suspended under the above condition in many cases. In such a case, it is a general practice to start the torch again after cutting off the electrode tip end automatically or manually upon formation of the stick phenomenon. However, the electrode cannot be fed towards the welding item due to the presence of that portion of the electrode set in the hold of the second abrasion-resisting guide member 3b as described above. Accordingly, it has generally been required to grasp the electrode tip end by cutting pliers or the like and to pull the electrode in the direction of $X_1$ thereby to remove the set electrode portion. However, since the space between the tip end of the welding torch and the welding item is normally selected to be approximately 10 through 30 mm, the torch must be sufficiently retreated to pull out the electrode in the direction of $X_1$, thus resulting in an inferior operability. Although sintered porcelain which is superior in abrasion resistance and heat resistance, is normally used as the guide members, the mechanical strength of such sintered porcelain is not very high, and thus, there are cases whereby the guide members are damaged during the forced removal of the set electrode portion as described above, thus resulting not only in an economic disadvantage, but also in the necessity of replacement of the guide member. Furthermore, in a arc welding operation using the consumption electrode, molten metal particles at high temperatures, i.e. the so-called sputter, are generally scattered, and in the welding torch having such a construction as shown in FIG. 1 through FIG. 3, the sputter tends to enter from an opening or the like into the passage of the electrode wire or sliding groove portion of the contact member, so that the delivering of the electrode wire or movability of the contact member may be interfered with. In the conventional welding torch as described above, the provision of a cover member may be used to prevent the sputter from entering the passage of the electrode wire and sliding groove portion of the contact member. However, in this case, it is difficult to manufacture a cover member to be applied to a narrow portion, thus requiring high manufacturing cost, and in addition, even when the cover member is provided, maintenance of the torch tip end portion cannot be effected sufficiently, thus resulting in poor operability.

SUMMARY OF THE INVENTION

Accordingly, an essential object of the present invention is to provide an improved welding torch which is efficient in operation with high reliability, while substantial eliminating the disadvantages inherent in the conventional welding torches of this kind.

Another important object of the present invention is to provide a welding torch of the above described type which is simple in construction, and can be readily manufactured on a large scale at low cost.

In accomplishing these and other objects, according to one preferred embodiment of the present invention, there is provided a welding torch which includes a contact member constituted by a power feeding member formed therein with a through-opening for passing a consumable electrode wire therethrough and a support member for supporting the power feeding member, a guide member for guiding the electrode wire, with the guide member being covered, at least at its forward end portion, by the contact member and with at least the forward end portion of the guide member and the contact member being arranged to be movable with respect to each other in a direction intersecting generally at right angles with an axis of the electrode wire, and a pressure means for relatively urging the contact member and the guide member for holding the electrode wire therebetween.

By the arrangement according to the present invention as described above, an improved welding torch that is highly efficient in operation has been advantageously presented.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
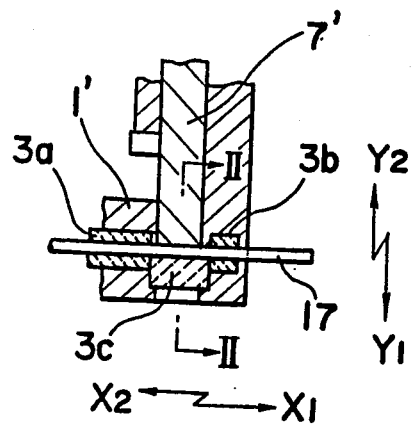
FIG. 1 is a fragmentary side sectional view of a main portion of a conventional welding torch (already referred to)
Figure 2:
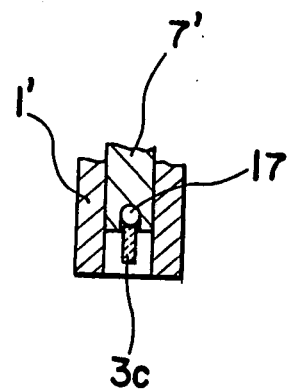
FIG. 2 is a fragmentary cross sectional view taken along the line II—II of FIG. 1 (already referred to)
Figure 3:
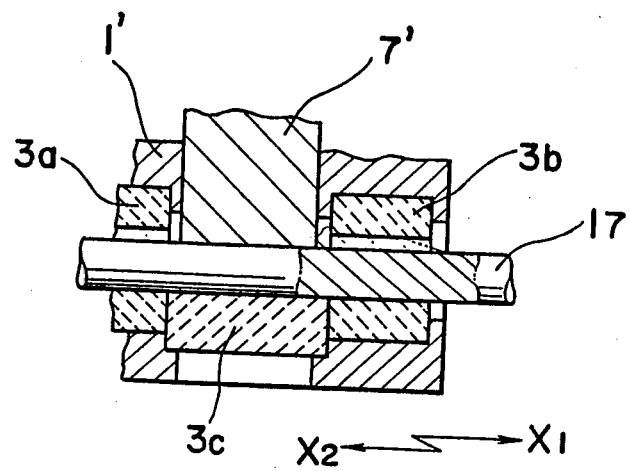
FIG. 3 is a fragmentary side sectional view showing, on an enlarged scale, of a lower portion of the welding torch of FIG. 1 (already referred to)

Before the description of the present invention proceeds, it is to be noted that like parts are designated by like reference numerals throughout the accompanying drawings.

Referring now to the drawings, there is shown in FIGS. 4 through 8, a welding torch TA of a type which carries out welding by supplying a shielding gas from a side portion of the torch body towards the front portion of the welding torch, while feeding current to a consumption electrode, according to one preferred embodiment of the present invention.

In FIGS. 4 through 8, the welding torch TA generally includes a torch body 1 coaxially formed with a central bore or through-opening 101 along its axis, an abrasion-resisting guide tube 2 detachably accommodated in said through-opening 101 and formed with a bore 2a, for example of a circular cross section, and another abrasion-resisting guide member 3 coaxialy formed with a through-opening 302 generally along the axis thereof, said guide member 3 being, for example, detachably mounted at the forward end portion of the torch body 1 through a clamping member 41 in the form of a bolt or the like.

The welding torch TA further includes first and second support members 51 and 52 made of electrically conductive material, and for example, the first support member 51 thereof is pivotally supported by the torch body 1 so as to be electrically insulated from the latter.

Figure 4:
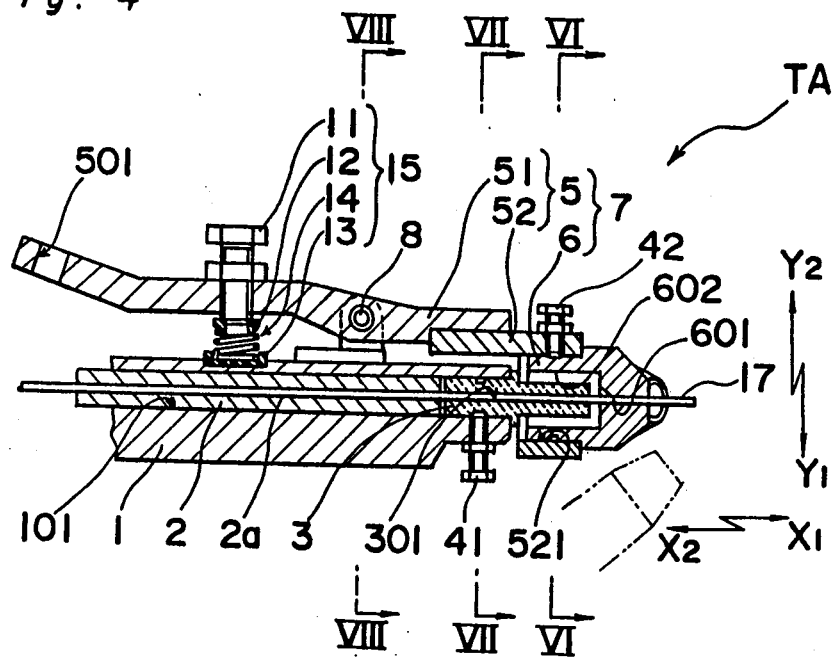
FIG. 4 is a side sectional view of an improved welding torch according to one preferred embodiment of the present invention.

More specifically, in FIG. 4, the first support member 51 is pivotally supported on a bracket of the torch body 1 through a pin 8 and electrically insulating bushes 9 and 9 (FIG. 8), while the second support member 52 provided with an opening portion 521, which opens in the X direction is detachably supported on the end portion of the first support member 51. A power feeding member 6 of an electrically conductive material, having a through-hole 601 coaxially formed generally along its axis and also a hole 602 with a bottom, which opens in the direction of $X_2$ is, for example, detachably supported, through a clamping member 42, in the opening portion 521 of the second support member 52. Under the condition where the power feeding member 6 is mounted on the second support member 52, at least the tip end portion in the direction of $X_1$ of the guide member 3 is engaged into the bottomed hole 602 of the power feeding member 6, and the guide member 3 and the bottomed hole 602 of the member 6 are properly spaced loosely in the direction of Y so that the guide member 3 and the member 6 may become mutually movable in the direction of Y. Accordingly, a contact member 7 is constituted by a support member 5 including the first support member 51 and second support member 52 and a power feeding member 6. There is provided an adjusting screw 11 threaded into the first support member 51 in a position beyond the pivotal connection at the pin 8 in the direction of $X_2$, while a compression spring 14 is provided between a spring receiver 12 which is rotatably supported at the end portion of the adjusting screw 11 and another spring receiver 13 loosely engaged with the torch body 1. At least one of the two spring receivers 12 and 13 is formed by an electrically insulating material. Thus, a pressure means 15 is composed of the adjusting screw 11, spring receivers 12 and 13, and compression spring 14. A gas feeding means 16 for feeding side shielding gas is coupled to the torch body 1 through a proper insulating material. A power feeding equipment (not shown) is coupled to the support member 5 by a proper means. For example, the support member 5 is coupled to the power feeding equipment (not shown) through a hold 501 formed in the support member 5.

In the above arrangement, the support member 5 is pivoted counter-clockwise in FIG. 4, against the pressure force of the pressure means 15, and an electrode wire 17 is fed in a state where the through-hole or bore 601 of the power feeding member 6 and the through-hole 301 of the guide member 3 are approximately aligned with each other. The support member 5 is released from the restriction after the electrode wire 17 has reached the through-opening 601 of the member 6. Thereafter, the electrode wire 17 is fed, while current is fed to the contact member 7 through the power feeding equipment (not shown). The welding operation is performed, with the shielding gas being caused to flow by the feeding means 16 for side shielding gas.

In this case, the contact member 7 is urged in the direction of $Y_1$ by the pressure means 15 and thus, the tip end portion of the contact member 7 is pivoted clockwise in FIG. 4 to come into contact with the electrode wire 17. Namely, the electrode wire 17 to be fed in the direction of $X_1$ by a feeding apparatus (not shown) is restricted by the guide member 3, and is fed to a welding position through sliding contact with the tip end member of the contact member 7, i.e., the power feeding member 6. Incidentally, the portion of the power feeding member 6 equivalent to the power feeding position thereof is gradually worn out as the welding operation proceeds, but since the member 6 supported by the support member 5 is urged in the direction of $Y_1$ by the pressure means 15, said member 6 is always held in contact with the electrode wire 17, irrespective of abrasion of the member 6 so as to feed the power positively. Furthermore, since the through-hole 601 of the member 6 is gradually worn out in the direction of $Y_2$ as the welding proceeds, a space is formed in the lower portion of the through-hole 601, namely, in the direction of $Y_1$, corresponding to the amount of abrasion. As the space becomes larger, sputtering caused during the arc welding may be directed in the direction of $X_2$, but since the electrode wire 17 is normally fed in the direction of $X_1$ during the welding, the sputter is externally carried away from the space at the lower portion of the through-hole 601, as the electrode wire 17 is fed. Moreover, since the power is fed, with the approximate semi-circular portion in the direction of $Y_2$ of the through-hole 601 being normally held in sliding contact with the electrode wire 17, the sputter cannot enter the feed portion. As described hereinabove, since there is no possibility that the sputtering affects adversely the power feeding and moreover, owing to the fact that the tip end portion of the guide member 3 is covered through engagement thereof into the bottomed hole 602 of the contact member 7, the sputter is hard to enter the feed passage of the electrode wire 17. As described above, since the sputtering does not interfere with the feeding of the electrode wire or does not deteriorate the power feeding, a welding operation similar to that under the early stage may be performed, even if the contact member 7 is worn out to a certain extent, an uniform welding may be effected for a long period of time. Incidentally, when the tip end of the electrode wire has adhered onto the welding item during arc start or during welding, the electrode wire is fed, to some extent, to the side of the welding item as described earlier. In this case, in the torch according to the present invention, no inconvenience is caused, because the contact member 7 may be properly pivoted about the pin 8 for displacement. Moreover, since the abrasion-resisting guide member like the conventional one is not disposed on the side of the welding item beyond the power feeding position, the undesirable setting of molten electrode as in the conventional torch does not take place. Accordingly, when the electrode wire has been fused onto the welding item, the welding operation may be immediately restarted only through proper cutting of the tip end of the electrode wire. There are no guide members positioned adjacent the items to be welded and thus replacement of the power feeding member can be readily and quickly achieved.

Figure 9:
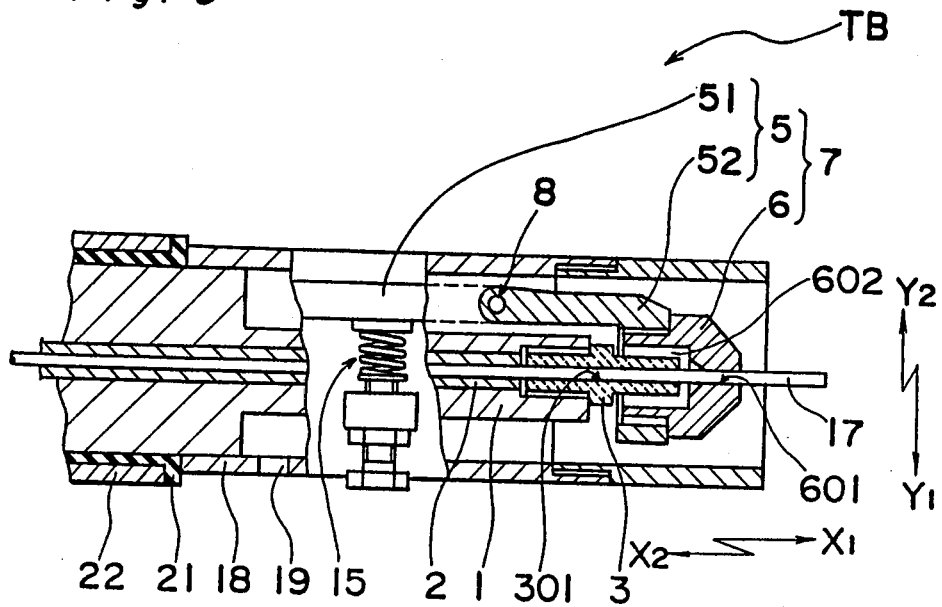
FIG. 9 is a fragmentary side sectional view showing a welding torch according to another embodiment of the present invention.
Figure 10:
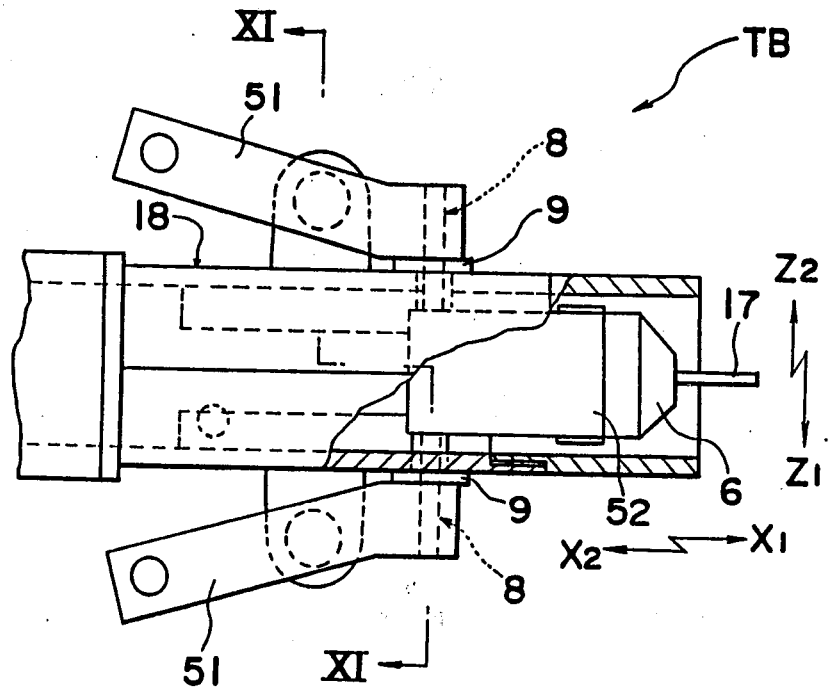
FIG. 10 is a top plan view, partly broken away, of the welding torch of FIG. 9.
Figure 11:
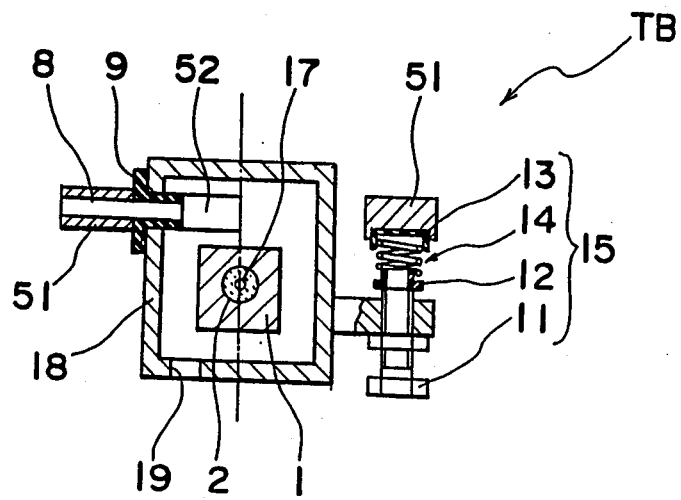
FIG. 11 is a cross section taken along the line XI—XI in FIG. 10.
Figure 12:
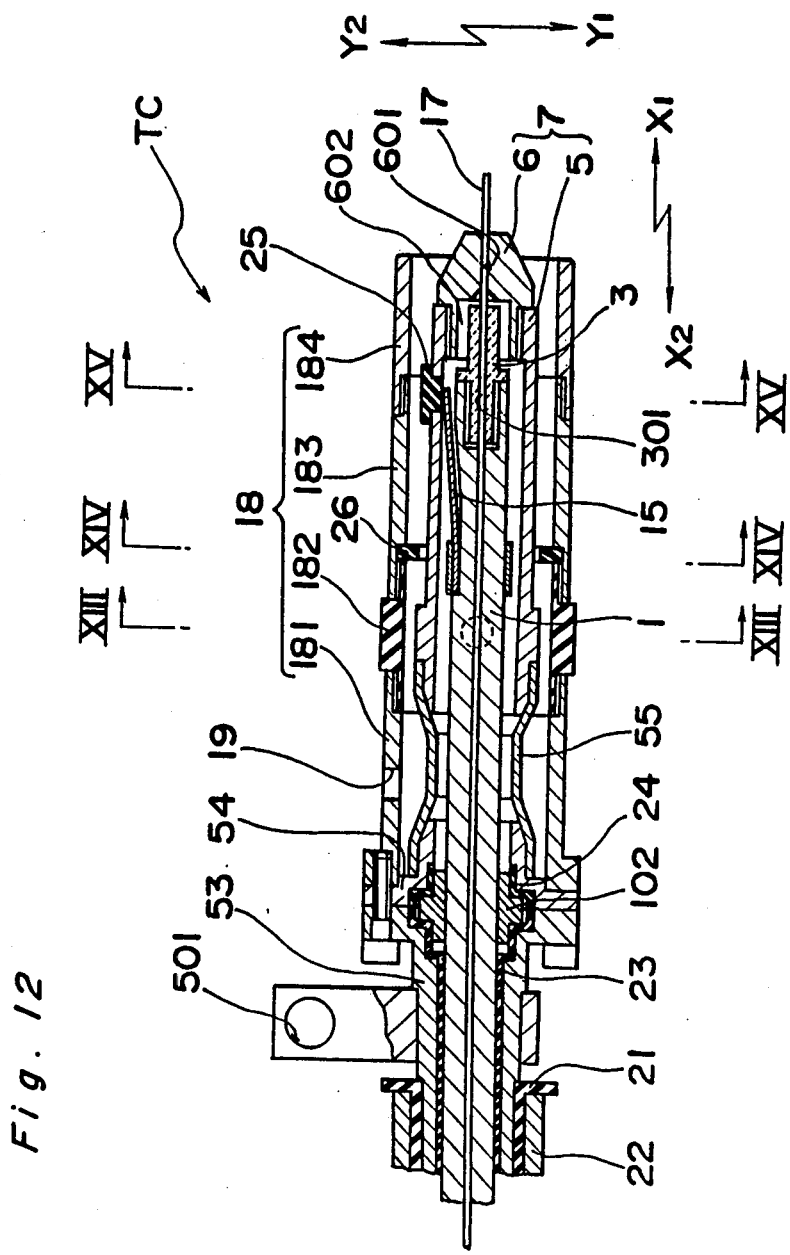
FIG. 12 is a fragmentary side sectional view showing a welding torch according to a further embodiment of the present invention.

Reference is made to FIG. 9 through FIG. 11 showing a welding torch TB according to another embodiment of the present invention, in which like parts in FIGS. 4 through 8 are designated by like reference numerals for brevity of description. In this embodiment, a cylindrical member 18 is provided to extend from the base portion towards the tip end portion of the torch body 1. In the illustrated embodiment, the cylindrical member 18 is divided, in the direction of X, into at least two parts. The second support member 52 is pivotally supported on the cylindrical member 18 through, for example, insulating bushes 9 and 9. The first support member 51 is integrally secured to the pin 8 projecting from the outer portion of the cylindrical member 18. The first support member 51 is urged by the pressure means 15, and thus, in FIG. 9, the support member 5 is pivoted clockwise. In the illustrated embodiment, the welding torch is properly supported by a mounting member 22 through an insulating member 21 disposed on the side of the $X_2$ direction of the torch body 1. Moreover, a shielding gas feeding port 19 is disposed on the base portion of the cylindrical member 18, and the welding is performed while the shielding gas is fed from the feeding port 19. In this embodiment, the guide member 3 is screwed to the end portion of the torch body 1. Similarly, the power feeding member 6 is screwed to the end portion of the support member 5.

Figure 13:
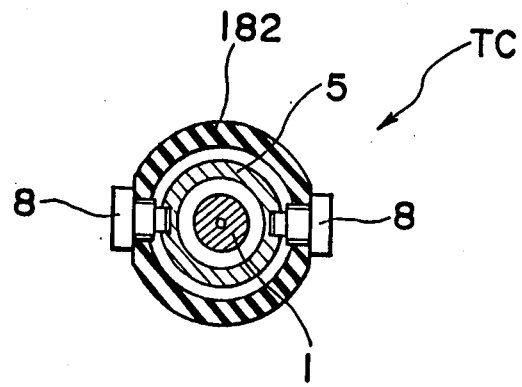
FIGS. 13 to 15 are fragmentary cross sectional views respectively taken along lines XIII—XIII, XIV—XIV, and XV—XV in FIG. 12.
Figure 14:
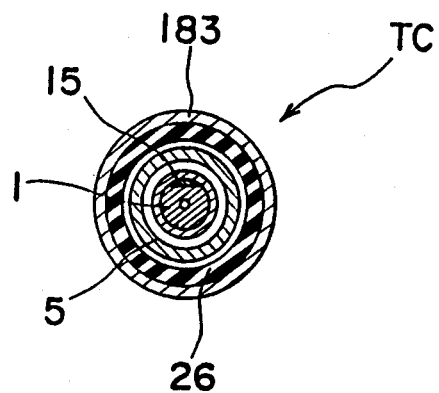
Figure 15:
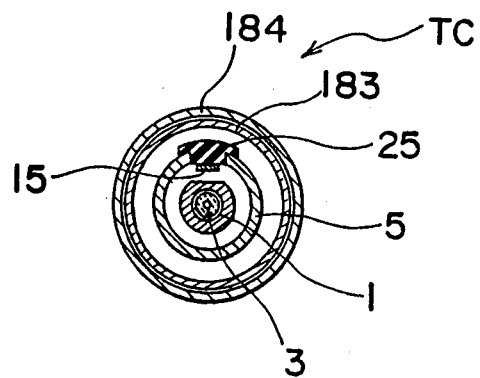

In FIG. 12 through FIG. 15 showing a welding torch TC according to still another embodiment of the present invention in which like parts in FIGS. 4 through 8 are designated by like reference numerals for brevity of description, a flange portion 102 is disposed on the base side of the torch body 1, and is held, through properly shaped insulating members 23 and 24, by a connection terminal 53 for power feeding and an intermediate member 54. The support member 5 for supporting the power feeding member 6 and the intermediate member 54 are coupled to each other by a flexible coupling member 55 such as a braided wire formed into cylindrical shape. Meanwhile, the cylindrical member 18 composed of members 181 through 184 is supported on the base side of the torch body 1 so as to cover the intermediate member 54, the flexible coupling member 55 and the contact member 7. In addition, the support member 5 is pivotally supported with respect to the cylindrical member 18. For example, as shown in FIG. 13, the second cylindrical member 182 is formed by an electrically insulating member, while said second cylindrical member 182 and the support member 5 are rotatably supported by the pins 8. A pressure means is formed, for example, by a leaf spring 15 supported, at its one end, by the torch body 1, with the other end thereof being held in contact with the insulating member 25 disposed on the support member 5. The contact member 7 is urged, counter-clockwise in FIG. 12, by the pressure means 15 about the pins 8 as the rotation center. A stopper 26 made of an insulating member is provided to prevent the contact member 7 from pivoting in the direction of $Y_2$ more than necessary. It should be noted here that, for further modifications, the stopper 26 and the second cylindrical member 182 may be integrally formed, or the pins 8 may be formed of an insulating material, or the first and third cylindrical members 181 and 183 to be disposed before and after the second cylindrical member 182 may be formed, respectively, by insulating material.

The tip end portion of the guide member 3 is engaged into the bottomed opening portion 602 of the contact member 7 so as to be covered thereby in the similar manner as in FIG. 4 and FIG. 9. As shown in FIG. 9 through FIG. 11 or FIG. 12 through FIG. 15, if the arrangement is made into the so-called center shielding type wherein the shielding gas is supplied into the cylindrical member, with simultaneous feeding of the electrode, most of the sputtering is interrupted by the cylindrical member, and even if sputtering is scattered from the opening of the cylindrical member, the sputter is hard to enter the feed passage for the electrode wire 17, because the tip end portion of the guide member 3 is engaged into the bottomed hole 602 of the contact member 7 to be covered thereby. Moreover, the welding may be effected for a long period of time in spite of the abrasion of the power feeding member so as to be particularly effective for automatic welding, because the electric power for welding is fed while the contact member 7 is normally in sliding contact with the electrode wire 17 through the pressure means 15.

Figure 5:
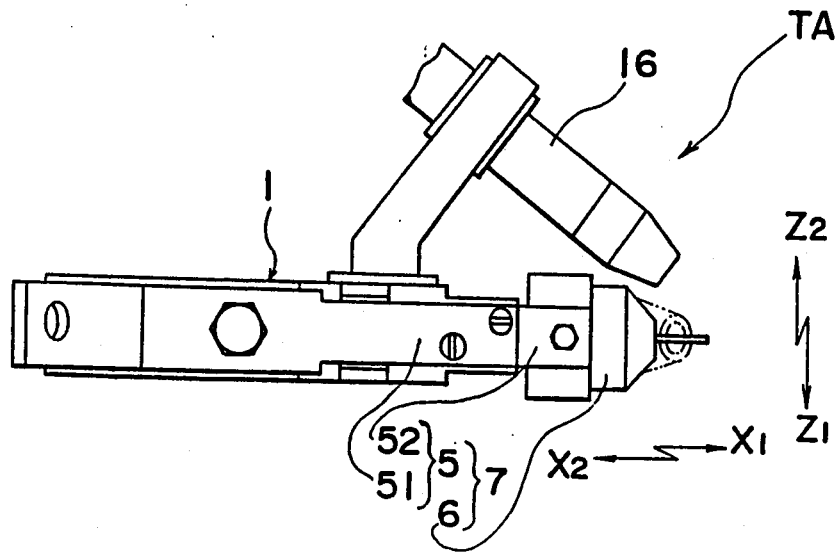
FIG. 5 is a top plan view of the welding torch of FIG. 4, FIGS. 6 to 8 are fragmentary cross sectional views respectively taken along lines VI—VI, VII—VII, and VIII—VIII in FIG. 4.
Figure 6:
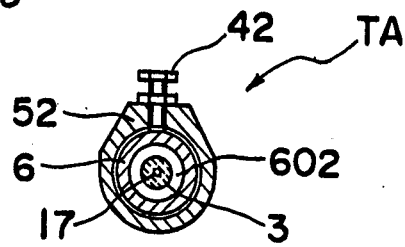
Figure 7:
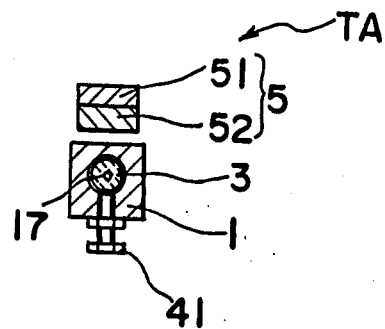
Figure 8:
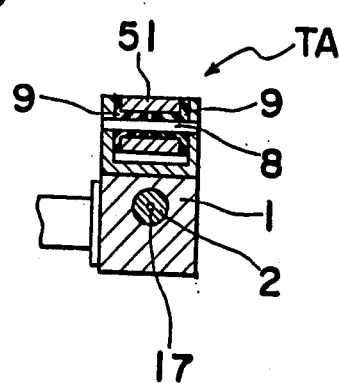

As shown in FIG. 4 and FIG. 5, if the plane including the axis of the torch body 1 and the axis of the side shielding gas feeding means is arranged to intersect generally at right angles with the rotating plane of the contact member 7, the side shielding gas feeding means will not become an obstacle during the pivotal movement of the contact member 7, thus facilitating replacement of the contact member. In spite of the above fact, if the plane including the axis of the torch body 1 and the axis of the side shielding gas feeding means is arranged to be generally in parallel to or aligned with the plane of pivotal movement of the contact member as shown by the two-dotted chain lines in FIG. 4 and FIG. 5, the space in the direction of Z necessary for the welding torch may be reduced so as to be suitable for welding of a welding item having a small length in the Z direction, for example, a welding item with a small gap. Furthermore, in the arrangement shown in FIGS. 4 and 5, if the side shielding gas feeding means is omitted, the welding torch is particularly suitable for the so-called non-gas shielded arc welding or submerged-arc welding. It should be noted here that, in the above arrangement, the guide tube 2 may be constituted by a wire of a proper shape, for example, of a circular or rectangular cross sections, etc. formed into a generally cylindrical configuration, while the cross section of the electrode may be of non-circular shape such as a rectangular configuration.

In addition, it is preferable that an insulating material is coated or covered on the outer periphery of the guide tube thereby to electrically insulate the consumption electrode 17 from the torch body 1. Moreover, when the guide tube is provided, the electrode wire may be smoothly guided through replacement of the guide tube according to the abrasion thereof. Futhermore, when the guide tube 2, the guide member 3 and the power feeding member 6, etc. are respectively arranged to be detachable, welding torches suitable for electrode wires of various shapes may be provided by replacing these members with ones having proper through-openings for required electrode wires. In spite of the above fact, the guide tube may be dispensed with. In addition, if the pressure means 15 is provided in the contact member 7 as shown in FIG. 12 through FIG. 15, it is advantageous, since the sputtering does not adhere to the pressure means 15.

Moreover, if the spring member 15, which is the pressure means is provided in the $X_2$ direction beyond the pivotal connection of the contact member 7, influence of welding heat upon the spring member 15 is small, while since the tip end portion of the welding torch is not bulky, the welding portion may be easily observed, and the pressure force can be easily adjusted. However, in spite of this fact, the spring member 15 may be arranged at the tip end side of the welding torch, beyond the pivotal connection of the contact member 7. Meanwhile, if the spring member 15 is merely employed as the pressure means, the welding torch may be advantageously rendered compact and inexpensive, but still, it may be so arranged that a link mechanism is coupled to the contact member 7 to urge it by the spring member thereby to construct the pressure means, or a hydraulic cylinder may be employed. Needless to say, the pressure means 15 shown in FIG. 9 through FIG. 11 may be rendered single. Moreover, if the torch body 1, support member 5, contact member 7, cylindrical body 18, etc. are forcibly cooled properly, the torch may be easily handled, and used for a longer service life, since each portion of the torch is not subjected to high temperatures. In addition, when the support member 5, namely, the coupling member for coupling the contact member 7 to the intermediate member 54 is of a cylindrical, flexible coupling member as shown in FIGS. 12 through 15, the torch body 1 is covered by the contact member 7 and the flexible coupling member 55, and therefore, there is no possibility that an electric shortcircuit phenomenon takes place between the contact member 7 and the torch body 1 by the sputtering. Furthermore, if the contact member 7 is arranged to be urged towards the side of the electrode wire 17 by the pressure means 15, with the guide member 3 being secured, the power feeding is effected in a steady state irrespective of the abrasion of the contact member 7, since the electrode wire 17 is restricted by the guide member 3, without deviation of the position aimed at by the electrode wire 17.

As is clear from the foregoing description, according to the first one of the present invention, since the contact member may be properly displaced pivotally, while said contact member formed with the through-hole 601 is made of an electrically conductive material, there is no possibility that an undesirable setting of the molten electrode will take place as in the conventional arrangements, even when the tip of the electrode has fused onto the welding item. Accordingly, during the adhesion, the welding may be restarted only by cutting the electrode tip end portion while the electrode is being fed, with a consequent favorable operability. Moreover, since the tip end portion of the guide member 3 is engaged into the bottomed hole 602 of the contact member 7 to be covered thereby, the sputter is hard to go into the feed passage for the electrode wire. In addition, since the electric power for welding is fed while the electrode wire is normally in sliding contact with the contact member 7 by the pressure means 15, the sputter cannot enter the power feeding portion. Accordingly, the delivering of the electrode wire is not interfered with nor is the power feeding condition deteriorated due to sputter. Meanwhile, since the power is fed while the electrode wire 17 and the contact member 7 are normally in sliding contact with each other by the pressure means 15, the electric power feeding may be positively effected despite possible abrasion of the contact member 7, and moreover, the replacement interval of the contact member 7 becomes longer, thus allowing uniform welding to be performed for a longer period of time, so as to be suitable particularly for automatic welding. Furthermore, according to the present second invention, in addition to the effect of the first invention, a precise gas shield arc welding may be performed with a stable arc, because the shielding gas fed by the side shielding gas feeding means shields the welding portion and its vicinity from the atmosphere. Accordingly to the third invention, in addition to realizing the effect of the first invention, most of the sputter may be prevented by the cylindrical body, because the side of the base portion of the torch is covered by the cylindrical body. Moreover, since the torch tip end portion has no directivity, it is effective for an automatic welding apparatus, which freely controls the position of the tip end portion of the torch, particularly in a a welding robot. Furthermore, according to the fourth invention, in addition to realizing the effect of the third invention. The guide member is covered by the rear cylindrical portion of the contact member so that no sputter particles can enter the feeding passage for the electrode wire, thereby eliminating the possibility that a smooth feeding electrode wire can be obstructed by the sputter and consequently a stable welding operation can be effected.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:

1. An arc welding torch which comprises:
   a torch body through which a consumable electrode wire is generally axially extended;
   a guide member having a hole formed in a generally axial position provided at a forward end portion of said torch body for guiding the electrode wire through the hole;
   a contact member formed with a forward portion constituted by a power feeding member having a through-bore for passing the electrode wire therethrough and a support member detachably supporting said power feeding member, said guide member being covered, at least at its forward end portion, with a rear portion of said contact member, said contact member being pivotally and electrically insulatively supported so that it can move in a direction generally intersecting at right angles with the axis of the electrode wire with respect to said torch body,
   and a pressure means for relatively urging said contact member toward a side of the electrode wire.

2. An arc welding torch which comprises:
   a torch body through which a consumable electrode wire is generally axially extended;
   a guide member provided at a forward end portion of said torch body for guiding the electrode wire through a through-hole generally axially formed therein;
   a contact member formed with a forward portion constituted by a power feeding member having a through-bore for passing the electrode wire therethrough and a support member detachably supporting said power feeding member, said guide member being covered, at least at its forward end portion, with a rear portion of said contact member, said contact member being pivotally and electrically insulatively supported to move in a direction generally intersecting at right angles with the axis of the electrode wire with respect to said torch body;
   a pressure means for relatively urging said contact member toward a side of the electrode wire, and
   a side shielding gas feeding means for feeding shielding gas towards the forward portion of said arc welding torch.

3. An arc welding torch which comprises:
   a torch body through which a consumable electrode wire is generally axially extended;
   a guide member provided at a forward end portion of said torch body for guiding the electrode wire through a through-hole generally axially formed therein;
   a contact member formed with a forward portion constituted by a power feeding member having a through-bore for passing the electrode wire therethrough and a support member detachably supporting said power feeding member, said guide member being covered, at least at its forward end portion, with a rear portion of said contact member, said contact member being pivotally and electrically insulatively supported so that it can move in a direction generally intersecting at right angles with the axis of the electrode wire with respect to said torch body;
   a pressure means for relatively urging said contact member toward the side of the electrode wire, and
   a cylindrical member for covering said contact member and said guide member from a base portion side of said torch body, said cylindrical member being formed at its base portion, with a shielding gas supply port towards the inner side of said cylindrical member.

4. An arc welding torch which comprises:
   a torch body with a base portion through which a consumable electrode wire is generally axially extended;
   a guide member provided at a forward end portion of said torch body for guiding the electrode wire through a through-hole generally axially formed therein;
   a contact member formed with a cylindrical forward portion constituted by a power feeding member having a through-bore for passing the electrode wire therethrough and a cylindrical support member detachably supporting said power feeding member, said guide member being covered by said cylindrical forward portion of said contact member, said contact member being pivotally and electrically insulatively supported so that it can move in a direction generally intersecting at right angles with the axis of the electrode wire with respect to said torch body;
   a pressure means for relatively urging said contact member toward the side of the electrode wire;
   a flexible connecting member which connects a power feeding connecting terminal provided at the base portion of said torch body with the support member of said contact member; and
   a cylindrical member for covering said connecting member and said contact member from a base portion side of said torch body, said cylindrical member being formed at its rear portion, with a shielding gas supply port accessing the inner side of said cylindrical member.

5. An improved electric arc welding torch for positioning a consumable electrode relative to work to be welded and for transmitting electrical current to the electrode comprising:
   a torch body having an opening therein;
   means for insulatively guiding the transmission of the electrode through the torch body opening including a replaceable abrasion resistant guide member positioned at and extending forward of the torch body;
   a power feeding member having a central opening, for receiving the electrode, spaced forward of the torch body and encompassing the forward end of the guide member to protect it from any sputtering of the electrode generated by the welding operation;

a support member connected to the power feeding member and movably connected to the torch body; and biasing means for urging one end of the support member away from the torch body to thereby force the power feeding member into a forced contact with one side of the electrode for transmission of electrical current to the electrode.

6. The invention of claim 5 wherein the support member is detachably connected to the power feeding member and is pivotally mounted to the torch body to permit movement transverse to the transmission of the electrode.

7. The invention of claim 6 wherein the support member is a lever pivotally mounted to the torch body and the biasing means is mounted at one side of the pivotal connection while the power feeding member is mounted at the other side of the pivotal connection.

8. The invention of claim 6 wherein the power feeding member has an approximately hollow conical configuration.

9. The invention of claim 7 further including means for providing a cylindrical gas shield member about the power feeding member.

10. The invention of claim 8 wherein the support member is cantilevered to extend forward of the guide member and the power feeding member is spaced from and extends about a major portion of the guide member that extends forward of the torch body.

11. The invention of claim 8 wherein the central opening is an elongated bore for passing and guiding the electrode.

12. The invention of claim 10 wherein the biasing means is adjustable to provide a variable force to the power feeding member.

* * * * *